Nov. 25, 1930. M. ORENSTEIN 1,783,134
CONTINUOUS SOLDERING
Filed Feb. 9, 1929
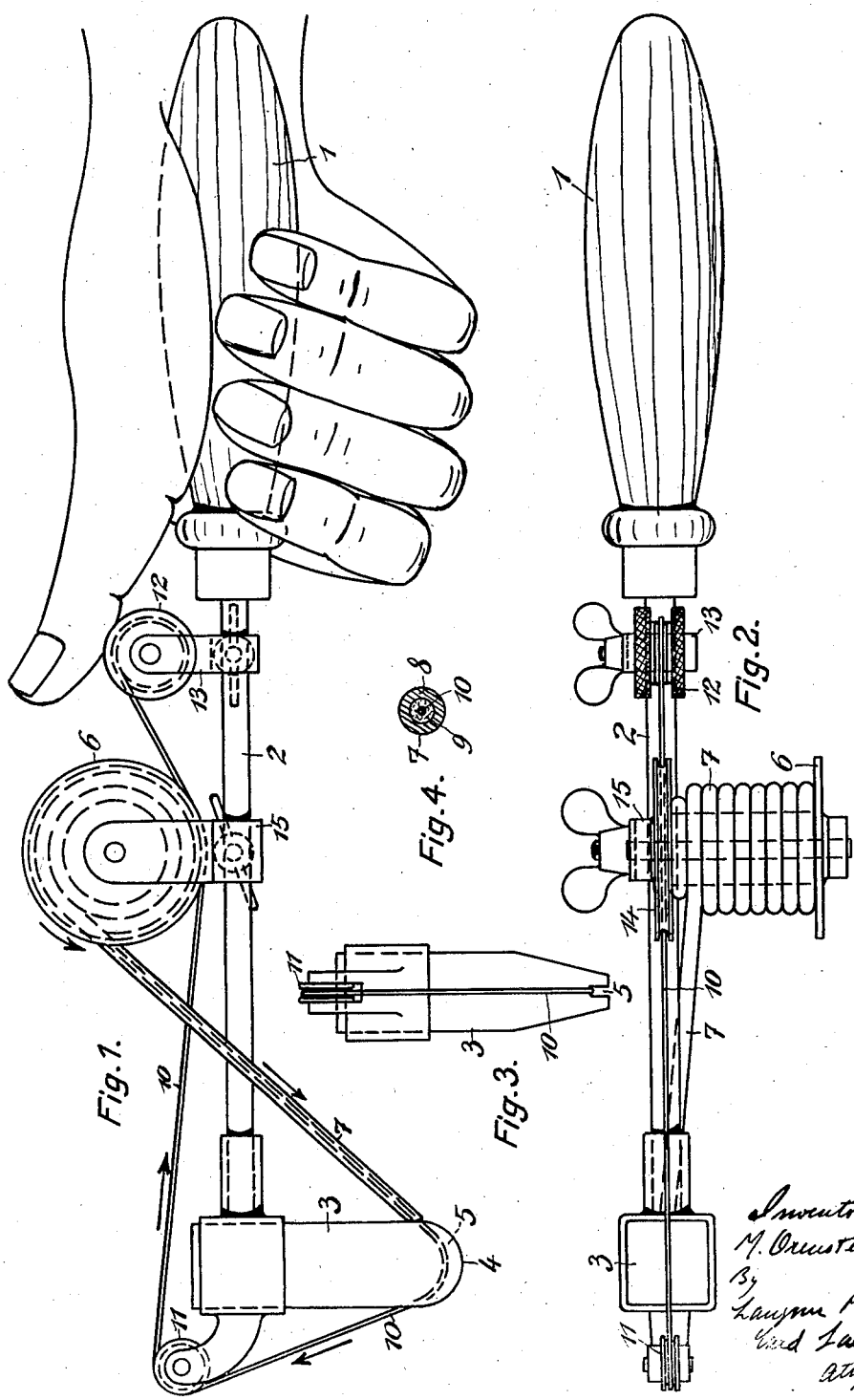

Patented Nov. 25, 1930

1,783,134

UNITED STATES PATENT OFFICE

MAX ORENSTEIN, OF BERLIN, GERMANY

CONTINUOUS SOLDERING

Application filed February 9, 1929, Serial No. 338,795, and in Germany February 15, 1928.

This invention relates to continuous soldering and is characterized by the fact that the soldering metal is fed by means of a socalled carrier wire consisting of metal which is not fusible in the soldering heat and is preferably embedded in the soldering wire itself. In a soldering club of this description a continuous feed and melting of the soldering metal takes place on the soldering club, the forward feed of the soldering metal being brought about by mechanical means in accordance with the consumption of the soldering metal. By this characteristic the new soldering device differs from known devices in which molten soldering metal is located in a hollow space of the soldering club and is fed to the soldering surface through channels; such known devices have not proved satisfactory in practice, owing to the fact that the feed of the molten soldering metal is difficult to regulate and an excessive discharge of metal frequently occurs. In like manner devices in which a soldering wire is continuously fed to the club have failed to give satisfaction, as the maintenance of the correct feed device presents difficulties and calls for the co-operation of two hands.

The present invention aims at eliminating these draw-backs in known devices. It is based on the utilization of a soldering wire, which combines in itself, in the known manner, soldering metal and soldering paste, but which in addition is provided with a wire metal not readily melted, such as club, copper, aluminium or the like. This wire is conveyed continuously to the soldering surface, so that soldering metal and soldering paste, according to the consumption of soldering metal, are continuously melted off the wire and the latter represents merely a carrier which brings the soldering metal to the soldering surface of the club or bit and permits of uninterrupted working until the available length of soldering wire is completely used up.

When carrying out long soldering operations with the aid of the new soldering wire it is possible, if desired, also to solder in the carrier wire and in this case the feed of the soldering wire to the soldering surface is particularly simple. In the majority of cases, however, it will not be desired to leave the carrier wire in the soldering wire and in these cases it is advisable to fit a mechanical feed device on the soldering club itself, by means of which the soldering wire is drawn down from a storage spool and under the soldering surface and the carrier wire is guided back and wound onto a spool. The carrier wire itself may either lie inside the soldering wire or be otherwise so combined therewith that it can continuously convey the soldering wire to the soldering surface. The soldering or melting wire itself is of round or flat crosssection, to permit of its being easily bent.

An embodiment of the invention is shown by way of example in the drawing, in which:—

Figure 1 is a side elevation,
Figure 2 is a plan view, and
Figure 3 an end view of a soldering device utilizing the new soldering wire.
Figure 4 is an enlarged section through the new soldering wire including its tension wire.

On a shaft 2 having a handle 1 is mounted the copper soldering head proper 3, which may fundamentally possess any known or suitable form and a preferably rounded soldering surface 4, which is provided with a central guide groove 5 through which the carrier wire 10 passes and in which the soldering metal melted off the carrier wire can lodge. The heating of the member to soldering temperature may be effected by any suitable means, for example electrically. Devices of this kind are known in themselves and are therefore not shown in the drawing.

On the shaft 2 a bracket 15 is detachably fitted, on which is rotatably mounted a drum 6. On the drum 6 is wound a considerable length of soldering wire 7 for example of circular cross-section and consisting of soldering metal 8 and soldering paste 9. The soldering wire 7 contains in its interior the flexible carrier wire 10 of metal not readily melted. On the front face of the club 3 a guide roller 11 is provided, around which the carrier wire, free from soldering metal 8 and soldering paste 9, is led back to a roller 12, which is rotatably mounted on a bracket 13 detachably connected with the shaft 2 and which roller can be rotated by the thumb of the workman's hand or by suitable mechanical means, in order to wind on the carrier wire 10. The carrier wire 10 runs during winding preferably over a grooved end disc 14 portion of the drum 6, in order to set the latter in rotation.

Having now particularly described and ascertained the nature of my said invention and in what manner the same is to be performed, I declare that what I claim is:—

1. A soldering club comprising a handle, a soldering head, storage means for a soldering metal wire containing a carrier wire non-fusible in the soldering heat, means for actuating the said storage means in order to advance the metal wire towards the soldering head in order to fuse soldering metal off the carrier wire and to apply such metal to the soldering head and means for winding up the carrier wire after the soldering metal has been removed therefrom.

2. A soldering club comprising a handle, a soldering head, storage means for a soldering metal wire, containing a carrier wire non-fusible in the soldering heat, guiding means adapted to lead the said soldering metal wire past the said soldering head, so that soldering metal may be fused off the carrier wire and be applied to the said soldering head, storage means for winding up the said carrier wire after the soldering metal has been removed therefrom, and an actuating mechanism for the said soldering metal wire and the said carrier wire storage means adapted to impart to the same a simultaneous soldering metal wire delivery and carrier wire receiving motion respectively.

3. A soldering club comprising a handle, a soldering head, a rotatable storage drum for a soldering metal wire containing a carrier wire non-fusible in the soldering heat, a rotatable storage drum for the said carrier wire, guiding means adapted to lead the said carrier wire from the one to the other storage drum and past the said soldering head, so that the soldering metal may be fused off the carrier wire and applied to the said soldering head, and a common actuating mechanism for both drums.

4. A soldering club comprising a handle, a soldering head, a rotatable storage drum for a soldering metal wire containing a carrier wire non-fusible in the soldering heat, a rotatable storage drum for the said carrier wire, guiding means adapted to lead the said carrier wire from the one to the other storage drum and past the said soldering head, so that the soldering metal may be fused off the carrier wire and applied to the said soldering head, a friction disk on the first mentioned storage drum adapted to be frictionally engaged by the said carrier wire when the same is passing from the soldering head to its storage drum so as to rotate the first mentioned drum to feed the soldering metal wire therefrom and an actuating mechanism for the said carrier wire storage drum.

5. A soldering club comprising a handle, a soldering head having a recessed guide groove, through which the carrier wire of a compound soldering metal and non-fusible carrier wire may pass and in which soldering metal melted off the carrier wire can be received and means for feeding the said compound wire from a compound wire storage drum into the said guide groove and for receiving the bare carrier wire when the same has yielded its soldering metal to the said soldering head.

6. A soldering club comprising a handle, a soldering head, a rotatable storage drum for a soldering metal wire, a non-fusible wire core contained within the solder wire and carried conjointly with the solder wire for feeding solder from the storage drum toward the soldering head, guiding means adapted to lead the said wire core past the soldering head, and means whereby said wire core can be pulled to bring about the feeding of solder.

7. A soldering club comprising a soldering head, storage means upon said club for a soldering wire, and means for leading said soldering wire to and past said soldering head.

8. A soldering club comprising supporting means, a soldering head carried by said supporting means, a rotatable storage drum upon said supporting means for a soldering wire, and means for leading said soldering wire to and past said soldering head.

9. A soldering club comprising supporting means, a soldering head carried by said supporting means, a rotatable storage drum upon said supporting means for a soldering wire, non-fusible feeding means forming a part of said wire, and means whereby said feeding means can be pulled to feed said soldering wire.

10. A soldering club comprising supporting means, a soldering head carried by said supporting means, a detachable storage receptacle upon said supporting means for solder wire having a non-fusible feeding means forming a part of said solder wire, guiding means upon said soldering head for said feeding means, and means for pulling said feeding means to thereby feed said solder wire to said soldering head.

11. A soldering club comprising a handle, a soldering head, a drum for soldering wire, a non-fusible portion, a second drum for said non-fusible portion forming a part of said wire, means leading said soldering wire to said soldering head, and means upon said first drum coacting with said non-fusible portion to cause rotation of said drum and serve as a brake therefore.

12. A soldering club comprising a handle, a soldering head and means for feeding a solder wire past the head, a carrier wire of metal non-fusible in the soldering heat contained within the solder wire for feeding the solder wire past the head.

In testimony whereof I affix my signature.

MAX ORENSTEIN.